United States Patent [19]

Bedell et al.

[11] Patent Number: 4,970,663

[45] Date of Patent: Nov. 13, 1990

[54] METHOD AND APPARATUS FOR MANIPULATING DIGITAL VIDEO DATA

[75] Inventors: Jeffrey L. Bedell, Arlington, Mass.; Gregory Cockroft, Santa Clara, Calif.; Eric C. Peters, Carlisle; William J. Warner, Weston, both of Mass.

[73] Assignee: Avid Technology, Inc., Burlington, Mass.

[21] Appl. No.: 344,697

[22] Filed: Apr. 28, 1989

[51] Int. Cl.⁵ .......................................... H04N 11/06
[52] U.S. Cl. ...................................... 364/521; 358/31
[58] Field of Search ....................... 364/521, 518, 519; 358/11, 12, 16, 31; 340/703

[56] References Cited

U.S. PATENT DOCUMENTS 4,597,005 6/1986 Baleshta et al. ..................... 358/15
4,743,959 5/1988 Frederiksen ........................... 358/12

*Primary Examiner*—Arthur G. Evans
*Attorney, Agent, or Firm*—Choate, Hall & Stewart

[57] ABSTRACT

Disclosed is a digital data processing system for scanning, compressing, storing, decompressing, and displaying digital video data, e.g., full motion video sequences such as those from a color television sequence or still photographs, in real time, e.g., at a rate of 30 frames per second for full motion video. The system operates in a personal computer environment, e.g., Macintosh II, using commonly available microprocessors, filing system, and display units.

6 Claims, 3 Drawing Sheets

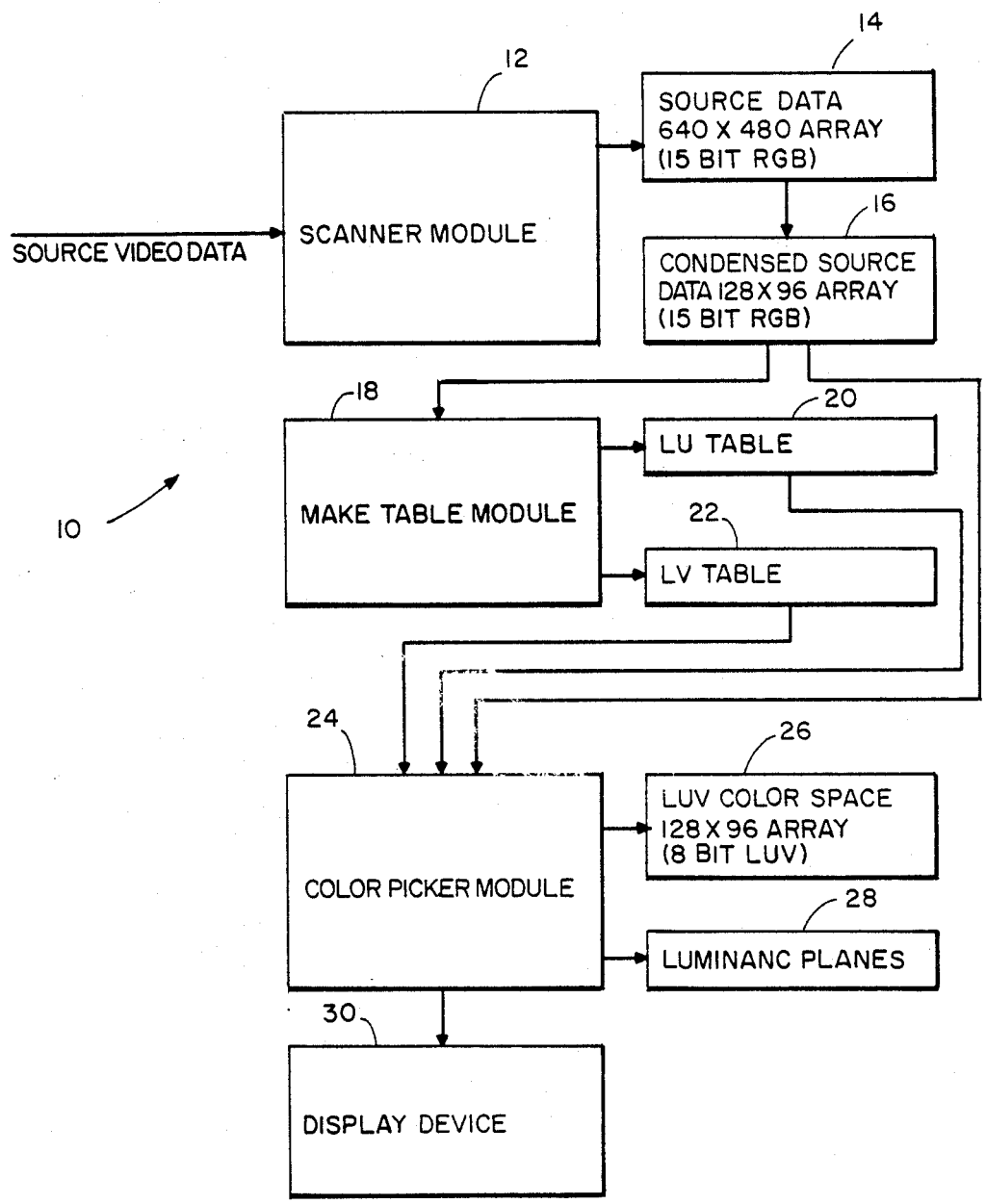
FIG. I

METHOD AND APPARATUS FOR MANIPULATING DIGITAL VIDEO DATA

BACKGROUND OF THE INVENTION

The invention relates generally to the field of digital data processing systems, and more specifically to digital data processing systems for manipulating video data.

Previously, manipulating video data, e.g., compressing, storing, decompressing, and displaying, and achieving high quality images required specialized hardware and a good deal of time.

Typically, video data comes from a source, e.g., a color television signal, and is scanned into 15 bit digital units consisting of five bits to represent each of red, green, and blue (rgb). In a simple sense, to properly display this data required a 15 bit display device, a large amount of storage, and a great deal of time to load and unload the data.

One solution to the problems of devices and storage was to sub sample the data, i.e., compress 15 bits of rgb data into 8 bits of rgb data so that less storage was needed and an 8 bit display device could be used. In sub sampling, the five bits representing red are reduced to three bits, the five bits representing green are reduced to three bits, and the five bits representing blue are reduced to two bits. Unfortunately, an image resulting from such a compression technique fails to account for nuances of an image and produces an effect known as "posterization," i.e., the resulting image resembles a poster. So, while it was possible to compress data and use an 8 bit display device, the quality of the images produced was poor.

In addition, if one wanted to display the video data quickly, i.e., in real time, on either a 15 bit or an 8 bit display device, significant data compression was necessary which required both time and computation. One way to speed up the display process and reduce the amount of computation was to divide the display image into sections and compute only the sections of the image that were changing, e.g., a person's mouth in a teleconferencing situation, and leave other sections of the image alone unless they changed. This approach, however, still required computation to determine which sections of an image were changing and, further, still did not provide quality images.

One solution to the problem of poor quality images was an asymmetric approach where no concern was taken for how much time it took to compress the video data but, because the data was so completely and neatly compressed, it could be displayed in real time. While this approach produced high quality images, it remained computationally expensive.

Related to the problem of producing high quality images is the problem of choosing colors. A typical display device addresses 256 colors. Previously, in a color fitting procedure, the best 256 colors for a particular image were chosen and displayed. However, if one wanted to then overlay another image or place two images side by side, the color fitting procedure would choose the best 256 colors for the second image and be unable to maintain the colors in the first image. Various other video effects, e.g., dissolves and digital effects, were equally difficult to implement and maintain.

SUMMARY OF THE INVENTION

Accordingly, one object of the invention is to provide fast compression and decompression of video data, e.g., at a rate of 30 frames per second, by creating and using lookup tables.

Another object of the invention is to use commonly available microprocessors such as those found in a standard personal computer (PC) system, e.g., Macintosh II.

Another object of the invention is to scan and compress data in real time, storing the data in large blocks of RAM and then reading the data from RAM in large blocks and storing it in a standard PC file system.

Another object of the invention is to provide a picture element (pixel) dithering technique that allows image display on display devices of a standard PC system and produces images of a quality sufficient for a variety of applications.

The above objects will be better understood upon consideration of the drawings and a description of a preferred embodiment.

BRIEF DESCRIPTION OF THE DRAWINGS

FIG. 1 is a block diagram showing the compression components of a video data processing system according to the present invention.

DESCRIPTION OF A PREFERRED EMBODIMENT

Figure 3:
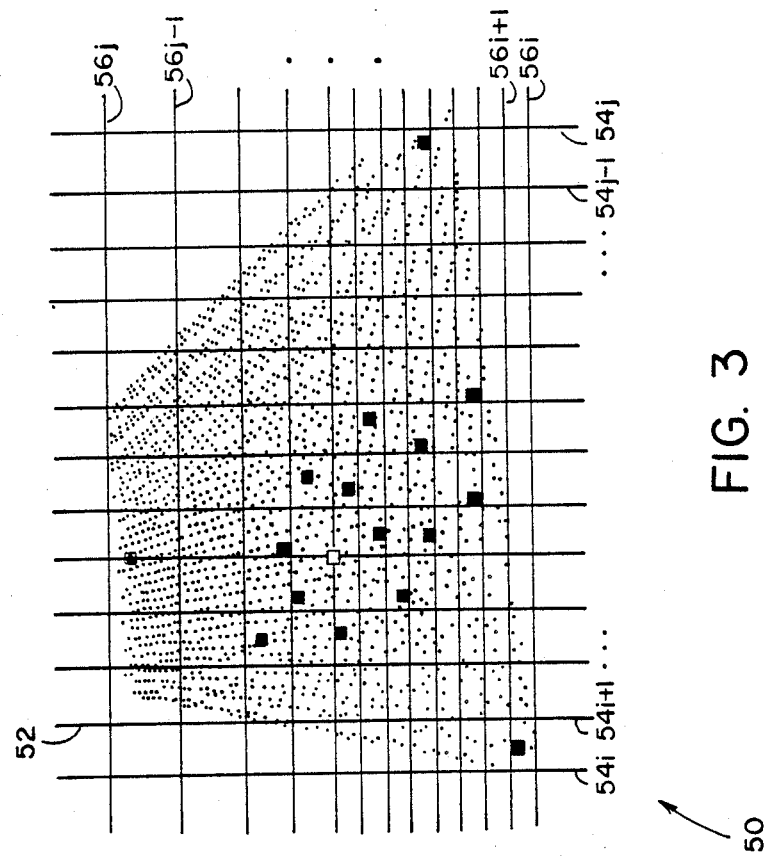
FIG. 3 is a diagram of a sample luminance plane created by the video data processing system.

Referring to FIG. 1, in a video data processing system 10, a scanner module 12 scans source video data, e.g., from a color television signal, and digitizes it to create a digital image. Scanning 640 points along a horizontal line and 480 points along a vertical line, the scanner module 12 creates a source data array 14 in RAM having 640 columns and 480 rows; each array element contains a 15 bit pixel and each pixel contains three color values: five bits each to represent red, green, and blue.

To simplify the digitization process, the source data array 14 is condensed by selecting every xth row of data and every yth column, e.g., select one row of data, skip the next four, select one column, skip the next four. Thus, a condensed source data array 16 having 128×96 elements each containing a 15 bit rgb pixel is created.

In preparation for transforming the rgb data of condensed array 16 into 1976 Luv color space data, a make table module 18 takes the condensed array 16 and creates two tables: a Lu table 20 and a Lv table 22. (L stands for luminance; u and v represent chroma values.) Each table is indexed with 15 bit rgb values and the make table module 18 computes the closest u and v values for each rgb index value and stores the u an v values in their respective tables.

A color picker module 24 then transforms the rgb data of the condensed array 16 into Luv color space data. Taking the 15 bit rgb pixels in condensed array 16 in pairs, the color picker module 24 looks up the first rgb pixel of the pair in the Lu table 20 and stores its 8 bit u value in a Luv color space array 26. The color picker then looks up the second rgb pixel of the pair in the Lv table 22 and stores its 8 bit v value in the Luv array 26 as well. This process continues for each pair of 15 bit rgb pixels in the condensed array 16.

As it is encoded in the Luv array 26, each 8 bit Luv pixel has a luminance value (defined by its u and v values together) and shares its chroma values u and v with its left and right neighbors.

The color picker module 24 next divides the Luv color space into multiple luminance planes 28 and displays the luminance planes 28 on a display device 30. Following a similar method as it did to transform rgb data to Luv data, the color picker module looks up the first of each rgb pixel pair of the condensed array 16 in the Lu table 20 to find a u value and define a plane. It then looks up the second of the pixel pair in the Lv table 22 to find a v value and define a plane. This process continues for all rgb pixel pairs in the condensed array 16. Once this process is done, the color picker module 24 displays the luminance plane as shown in FIG. 3.

Figure 2:
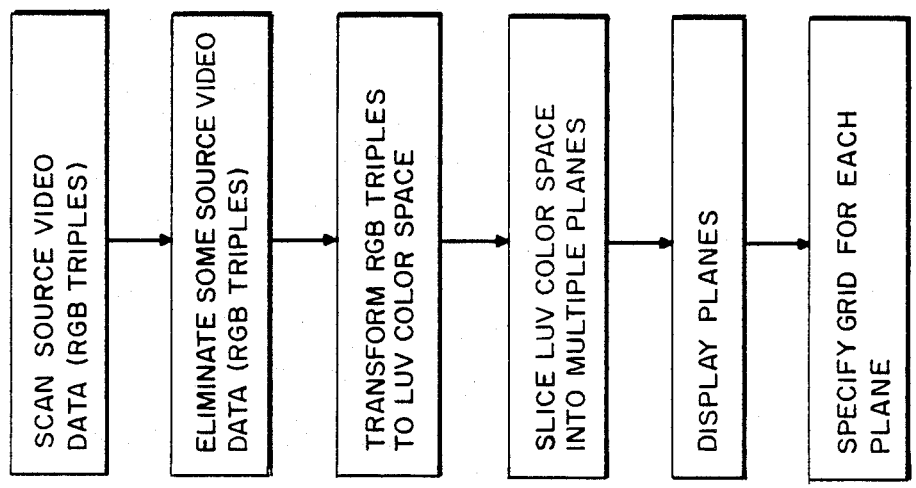
FIG. 2 is a flowchart showing the general operation of the compression components.

Referring to FIG. 2, the general operation of the video data processing system 10 is summarized in flow chart form.

Referring to FIG. 3, a sample luminance plane 50 is represented as dots and squares within a digtitization grid 52. The digitization grid 52 is measured by (u,v) coordinates, i.e., vertical lines 54$i$–54$j$ represent u values while horizontal lines 56$i$–56$j$ represent u values. In FIG. 3, hollow squares represent where intersecting u and v values are zero; solid squares represent color table entries used to play back images on the display device 30; and dots represent 15 bit rgb values as they fall within the plane 50.

Note: Most of the colors in each luminance play are centered around gray since most of the colors in the source video data are unsaturated. To assist one in choosing the best colors for a luminance plane, the color picker module uses a predefined data file to represent and display a sampling of 15 bit rgb images.

Figure 4:
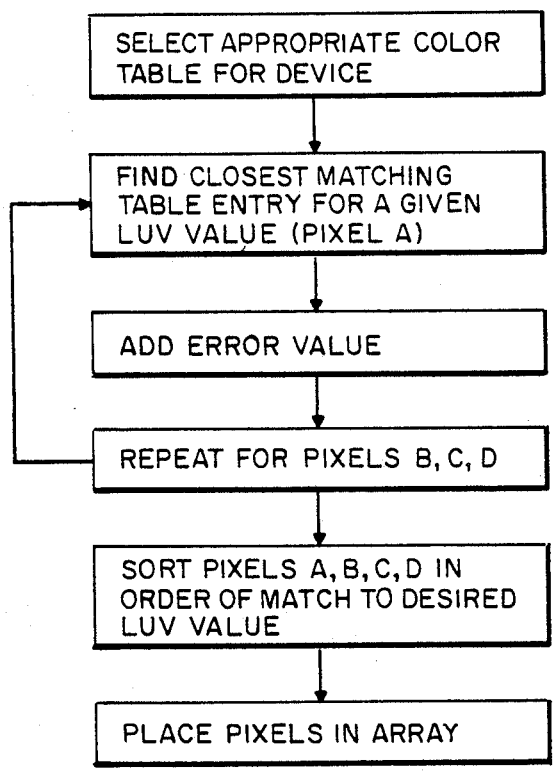
FIG. 4 is a flowchart showing the general operation of the playback components.

Referring to FIG. 4, the general playback operation of the color picker module 24 is summarized in flow-chart form.

Figure 5:
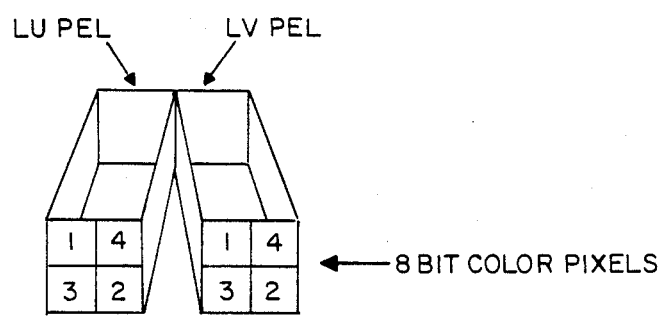
FIG. 5 is a diagram showing a pair of 8 bit pixels dithered into eight pixels.

In preparing for the playback operation, the make table module 18 creates play table array having 256×192 elements each containing an 8 bit Luv pixel. This play table is derived from the Luv array 26. It is double the size of the Luv array because the method of encoding Luv pixels makes it possible to share data and, therefore, represent more data. Each pair of pixels in the Luv array 26 is dithered into a 2×4 array of display pixels to be shown on display device 30, i.e., 16 bits of data are dithered into 64 bits of data as shown in FIG. 5.

In order to display the best possible image, the color picker module 24 selects a color table appropriate for the display device 30. To find colors for the eight display pixels dithered from each pair of pixels in the Luv array 16, the color picker module 24, for each dithered pixel, selects an entry in the color table containing a display pixel that most closely matches the dithered pixel and adjusts for any difference between the dithered pixel and the selected display pixel. The color picker then sorts the eight selected display pixels according to how closely they matched the dithered pixels and places them in ordered display locations 1, 2, 3, and 4 on the display device. A playback module then displays the images represented in the play tables.

To further enhance the quality of the displayed image, the make table module 18, selects a set of eight pixels for each (Lu, Lv) pair. Because chroma values u and v are shared by neighboring pixels, there is potential for significant color errors at sharp chroma boundaries. However, since chroma boundaries are typically accompanied by luminance boundaries, the make table module 18 adjusts for differences between luminance values in each pair of pixels. If the absolute of a difference is significant, the chroma u and v values for that pair of pixels are set to zero. This effectively eliminates color from the resulting display pixels and provides a higher perception of quality. Note: Only the chroma levels need be varied as the luminance values remain constant.

In addition to being able to compress, decompress, and display video data in real time and produce high quality images, the video data processing system of the present invention is also able to perform various video techniques such as displaying multiple images while maintaining proper colors in all the images, dissolving from one image to another, and producing digital effects.

The video data processing system is able to perform real time dissolves from an image, e.g., Image A, to another image, e.g., Image B, using a constant k which varies between 0 to 1 over a number of frames.

The formula for a dissolve is $k \times A + (1-k)B$. So, for example, when $k=0.5$, the displayed image is one half Image A and one half Image B. While computations for dissolves were previously computationally expensive, the present invention avoids much of the computation by pre-computing sixteen lookup tables containing data for images at sixteen values of k.

Consider that a standard dissolve occurs over approximately 30 frames or one second. The present invention requires roughly half as many lookup tables as frames because in a dissolve where Image A is replaced by Image B, the invention reads data from tables 1 through 16 in that order. In the first frame, 31/32 of A and 1/32 of B are displayed. In the next frame, 30/32 of A and 2/32 of B are displayed. This process continues, the amount of A displayed decreases while the amount of B increases until half of each (16/32 and $k=0.5$) are displayed. At this point, the process of reading data from the tables is reversed and the tables are read from 16 through 1. In this way, the amount of A is now reduced while the amount of B is increased.

Further, the dissolves performed by the present invention allow 8 bit Luv pixels to be operated on independently of one another even though they share color information.

The present invention also performs digital effects, e.g., as in a television newscast when an overlaid image in a corner of the screen expands in size to take up the entire screen.

Another aspect of this invention, editing and displaying various digitized and compressed video data, is described in the attached appendix and is made a part of this application.

The above description is limited to a specific embodiment of the present invention. It will be apparent, however, that variations and modifications may be made to the invention with the attainment of some or all of the advantages of the invention. Therefore, it is the object of the following claims to cover all such variations and modifications as come within the true spirit and scope of the invention.

We claim:

1. A method of processing source digital data having a plurality of rows of pixels, said pixels represented in a first format, said method comprising the steps of:
   a. creating compressed digital data by selecting every xth row of said rows of pixels and selecting every yth pixel in each of said rows of pixels of said source digital data;
   b. transforming said compressed digital data from said first format to a second format by selecting a pair of pixels from said compressed digital data, and
      i. transforming the first of said pair of pixels in said first format in response to an entry in a first transformation table to create a first pixel of a pair of pixels in said second format, and
      ii. transforming the second pixel of said pair of pixels in said first format in response to an index entry in a second transformation table to create a second pixel of said pair of pixels in said second format.

2. A method of processing source digital data having a plurality of rows of pixels, said pixels represented in a first format, said method comprising the steps of:
   a. creating compressed digital data by selecting every xth row of said rows of pixels and selecting every yth pixel in each of said rows of pixels of said source digital data;
   b. transforming said compressed digital data from said first format to a second format by selecting a pair of pixels from said compressed digital data, and
      i. transforming the first of said pair of pixels in said first format in response to an entry in a first transformation table to create a first pixel of a pair of pixels in said second format, and
      ii. transforming the second pixel of said pair of pixels in said first format in response to an entry in a second transformation table to create a second pixel of said pair of pixels in said second format;
   c. locating each of said pixels in said second format in a lookup table and displaying said pixels on a display device according to information found in said lookup table.

3. A digital data processing system comprising a central processing unit, memory, and operating system, a plurality of modules comprising a compression module which processes source digital data having a plurality of rows of pixels in a first format, said compression module comprising:
   a. selection means for creating compressed digital data having a plurality of rows of pixels in said first format by selecting every xth row of said rows of pixels and selecting every yth pixel in each of said rows of pixels;
   b. transformation means for transforming said compressed digital data from said first format to a second format by selecting pairs of pixels from said compressed digital data, and
      i. transforming a first pixel of said pair of pixels in said first format in response to an entry in a first transformation table to create a first pixel of a pair of pixels in said second format, and
      ii. transforming a second pixel of said pair of pixels in said first format in response to an entry in a second transition table to create a second pixel of said pair of pixels in said second format.

4. A method of processing source digital data having a plurality of rows of pixels, said pixels represented in a first format, said method comprising the steps of:
   a. creating compressed digital data by selecting every xth row of said rows of pixels and selecting every yth pixel in each of said rows of pixels of said source digital data;
   b. transforming said compressed digital data from said first format to a second format by selecting a pair of pixels from said compressed digital data, and transforming the first of said pair of pixels in said first format to create a first pixel of a pair of pixels in said second format, and transforming the second pixel of said pair of pixels in said first format in response to create a second pixel of said pair of pixels in said second format such that said pair of pixels can be combined to represent shared data.

5. The method of claim 1 wherein a pair of pixels in said second format is transformed by dithering a first pixel of said pair of pixels in said second format into a plurality of pixels in said second format an dithering a second pixel of said pair of pixels in said second format into a plurality of pixels in said second format.

6. The method of claim 2 wherein said lookup table is created comprising the steps of:
   a. selecting, for each of said dithered pixels, a dithered pixel from said dithered pixels and selecting a pixel in said second format from a plurality of pixels in said second format, said selected pixel being one in said plurality of pixels that most closely matches said dithered pixel and adjusting for any difference between said selected pixel and said dithered pixel,
   b. sorting said selected pixels in order of their closeness in matching said dithered pixels,
   c. positioning said selected pixels in display locations of said display device.

* * * * *

UNITED STATES PATENT AND TRADEMARK OFFICE
CERTIFICATE OF CORRECTION

PATENT NO. : 4,970,663

DATED : November 13, 1990

INVENTOR(S) : Jeffrey L. Bedell, et al

It is certified that error appears in the above-identified patent and that said Letters Patent is hereby corrected as shown below:

Column 3, line 26: change "u values" to --v values--.

Signed and Sealed this

Sixteenth Day of June, 1992

Attest:

DOUGLAS B. COMER

Attesting Officer

Acting Commissioner of Patents and Trademarks